Nov. 22, 1955
A. S. IRWIN
2,724,590
SHOCK ABSORBER OF THE OLEO STRUT TYPE
Filed Nov. 14, 1951
2 Sheets-Sheet 2
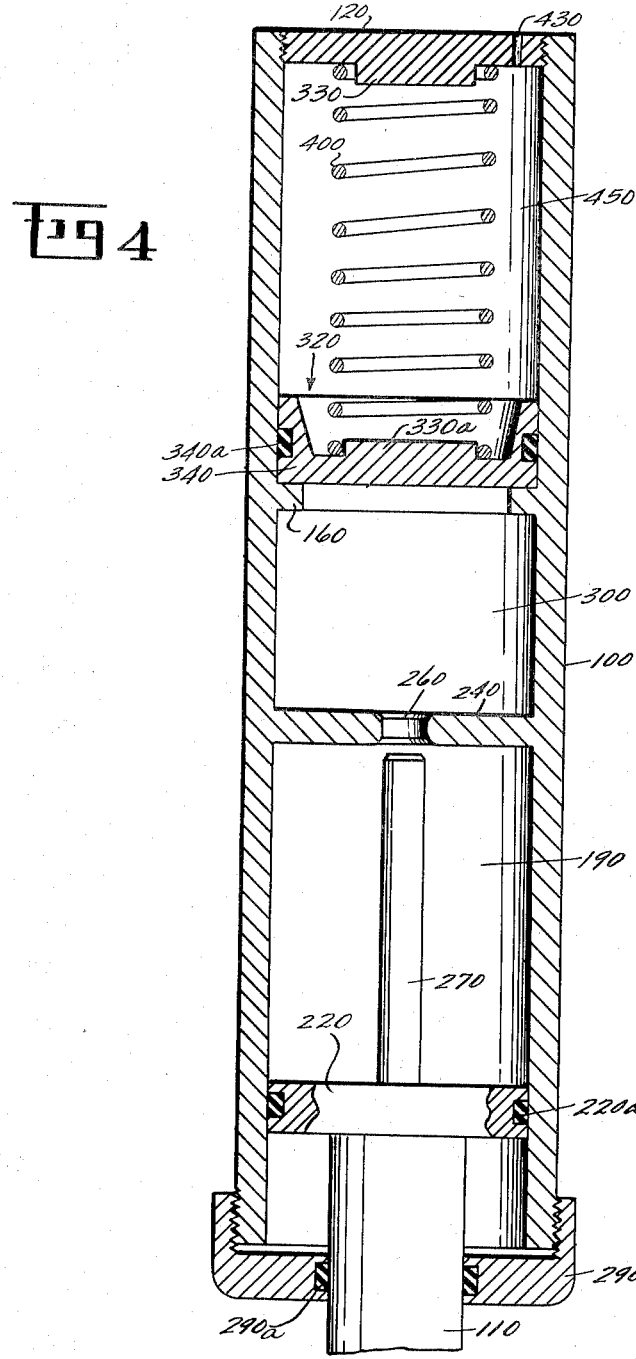
INVENTOR.
ARTHUR S. IRWIN
BY Wade Koontz
Chester Tietz
ATTORNEYS

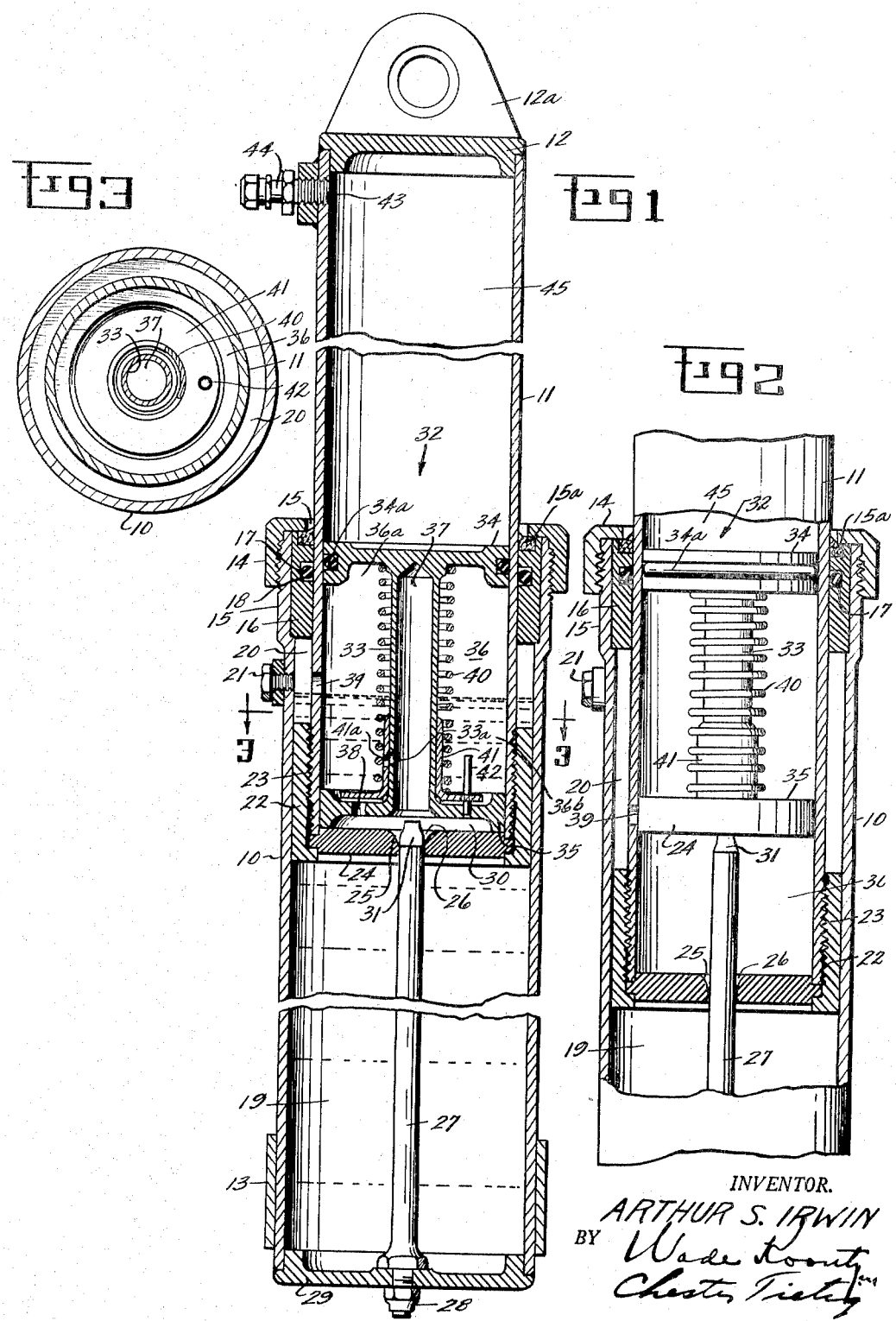

United States Patent Office 2,724,590
Patented Nov. 22, 1955

2,724,590

SHOCK ABSORBER OF THE OLEO STRUT TYPE

Arthur S. Irwin, Sinclairville, N. Y., assignor to the United States of America as represented by the Secretary of the Air Force Application November 14, 1951, Serial No. 256,284

7 Claims. (Cl. 267—64)

The invention described herein may be manufactured and used by or for the Government for governmental purposes without payment to me of any royalty thereon.

This invention relates to a shock absorber of the oleo strut type which is especially intended for use in aircraft landing gear. It belongs to that class of struts in which there are two telescopic tubular members closed at their outer ends, the one of the smaller diameter generally being positioned higher than the one of larger diameter.

Briefly stated, the construction in the preferred form embodies a lower cylinder into which there slides from above a hollow piston, which is hereinafter usually called the first piston. In the lower part of the first piston is a free floating piston. Both pistons contain an air charge, the one in the first piston being given an initially higher pressure than the one in the free floating piston, whereby to overcome static load and to position the strut at the proper elevation. The charge in the free floating piston is the one of lesser volume and is intended to be the one first dynamically compressed. When both charges have reached the same degree of compression subsequent forces tending to compress them to a greater degree act upon them as substantially a single gas volume; therefore, among the objects of this invention is to provide a shock absorber of the above character to provide a cushioning means for an aircraft landing gear which definitely establishes the static position of the gear without necessitating excessive pressure in the fully compressed position.

Another object of the invention is to provide a shock absorber in which there are two definite and separate volumes of air and a volume of oil. The smallest volume, i. e., a volume of air, is intended to receive the initial shock and to be more and quickly compressed than the second or larger volume of air, which is already compressed when introduced, to a degree that will just overcome the static load on the strut and so establish the desired static position on a landing gear.

A third object of the invention is to provide a structure in which the two air charges will build up resistance at differential rates but with an extremely high initial rate of gain in resistance, coupled with a subsequent decreased rate of pressure build up inside the strut, the latter being caused by the larger volume being finally compressed over the degree to which it was initially compressed.

In the accompanying drawings,

Fig. 1 is a longitudinal section showing the device under static stress only.

Fig. 2 is a view corresponding to Fig. 1 except that the free floating piston is not sectioned.

Fig. 3 is a cross section taken on the line 3—3 of Fig. 1.

Fig. 4 is a view of a modified form of the invention, this view corresponding to Fig. 1.

In the first three figures of the drawings, 10 is a cylinder closed at the bottom by means which will be later described. 11 is a hollow piston or tubular member of considerably smaller diameter than the cylinder 10 which piston is provided at its top with a closure 12. Upon the closure 12 there is integrally mounted a tab 12a which is conventional for the attachment of the airplane fuselage. The lower portion of the cylinder 10 is encircled by a band 13 which is attached by either welding or a shrink fit, such a band being conventional for the attachment of the wheel parts of the landing gear.

The top of the cylinder 10 has threadedly attached to it a cap 14 in which there is a large opening 15 through which the hollow piston 11 may freely slide. The contact between the edges of the opening 15 and the piston 11 is sealed by a packing gland 15a. Immediately below the collar 14 there is a collar 16 in which there is a groove 17 for the reception of a rubber O-ring 18. The O-ring acts to establish a hydraulic seal against the escape of oil from a filling of oil 19 which is contained in the lower part of the lower cylinder 10.

Below the collar 16, and separated therefrom by an annular reservoir 20, which is provided with a filling closure 21, there is a piston head 22 which fits the interior surface of the lower cylinder 10 closely and is slidable therein. It is attached by threads 23 to the outer surface of the hollow or first piston 11 and its lower central orifice is enclosed by an orifice plate 24 in which there is an opening 25 which has a countersunk top surface 26. Into the opening 25, there fits loosely a metering pin 27 which is attached by a nut 28 to the bottom closure 29 of the lower cylinder 10. The opening 25, together with the metering pin 27, constitutes a metering means for the controlled escape of oil from the filling 19 to a space 30 just above the orifice plate 24. The top end of the metering pin 27 is provided with a tip 31 of the general graduated curvature shown so that the rate of closure of the opening 25 may be controlled. This in turn controls the rate of pressure exerted upon the oil filling 19.

Within the lower part of the first piston 11, as may be seen from Fig. 1, there is a second piston 32 which floats freely under dynamic loads from the lower extreme position shown in Fig. 1 to the upper extreme position shown in Fig. 2. The piston 32 is of the spool type and is provided with a central vertical cylindrical core 33 which spaces and supports a pair of upper and lower skirts 34 and 35, respectively, from each other, thereby leaving an interior space 36. This space, as shown in Fig. 1, is intended for a filling of both oil and air. The air partial filling is indicated by 36a and the oil partial filling by 36b. The core 33 is also hollow and contains an upright cylindrical space 37 into which the metering pin 27 may project for a short distance so as to entrap and compress oil entering thru port 33a after the space 30 has been completely filled with oil. An initial filling of oil and air is introduced into the space 36 through a port 39 in the side wall of the lower part of the first piston 11, which in the uncompressed position of the strut is as shown in Fig. 1 may be filled manually from the outside after removing the closure 21. After such operation, the closure is of course reinserted. The lower skirt 35 is provided with a vertical metering orifice 38 which makes possible the upward flow of oil from the space 30 into the space 36b. Surrounding the central core 33 of the piston 32 there is a coil spring 40. This spring is arranged to press against a slide valve 41 which encircles the core 33 of a piston 32 and extends over and completely closes the metering orifice 38 in its lowest position. The slide valve is slidable upwardly on one or more dowel pins 42 extending into the lower skirt 35. In an upper cylindrical portion of the foot 41 there is an orifice 41a which registers with the orifice 33a of the core 33 only after the foot 41 has been forced upwardly against the action of the biasing spring by oil pressure transmitted thru the orifice 38 from the space 30 under the urge created by the downward travel of the first piston 11.

After the shock absorber has been mounted on the airplane in the conventional way, and the filling of oil and atmospheric air has been introduced through the port 39 by removing the closure 21 and reinserting same, the length adjustment of the strut is made for static load by introducing compressed air through the opening 43 which is closed by the closure 44 near the top of the first piston 11. This filling of air 45 may be regulated either as to volume, or as to pressure, or as to both, to produce the desired length of a strut under static load. For the purposes of the dynamic action of this shock absorber, the oil fillings 19 and 36b may be regarded as different fillings, although they are in substantial communication through the ports 38 and space 30 and the metering orifice 29.

Operation begins when the hollow or first piston descends upon the tip 31 of the metering pin 27, thus driving a certain amount of oil and air into the core space 37. Further downward travel by the first piston 11 lifts the free piston 32 to the position shown in Fig. 2, the O-ring 34a on the upper skirt 34 of which blocks off any possible flow of air from the space 36 to the space 45 or vice versa. As the pressure within the space 37 rises, the pressure within the space 36 also rises due to oil being moved upwardly thru the orifice 38. The upwardly moving oil lifts the foot 41 thereby aligning the orifice 33a and 41a. Oil or air or both are now displaced from space 37 to the fillings 36a and 36b thru ports 33a and 41. The port 39 is displaced downwardly so that it comes to a position opposite the side of the skirt 35, thereby preventing escape of fluid from the spaces 36a, 36b and from the oil filling 19. A considerable reduction in volume occurs first in the air filling in the space 36a due to compression by oil under pressure passing upwardly thru port 38 and horizontally thru ports 33a and 41a followed by a lesser proportionate reduction in the air filling 45 within the first piston 11, because the latter volume is at the higher pressure. This action has the advantage that the initial shock is easily taken up by allowing considerable relative movement of parts necessary to compress the air in spaces 37 and 36a but the resistance stiffens within an extremely short time interval due to the piston 32 being displaced upwardly by contact within the metering pin 27. The stiffer resistance of the compressed air filling 45 is then encountered but the rate of build up decreases due to the larger volume undergoing compression. The blow has then been cushioned by a rapidly stiffening resistance which operates in a predeterminable graduated fashion, thus saving the airplane fuselage body from considerable, or all, of the shock.

The pressure is first exerted upon the oil in the filling 19, forcing it up thru the orifice plate opening 25 into the fillings 36a and 36b, the latter being also augmented by oil flowing upwardly thru the port 38. The air fillings 36a and 45 undergo pressure simultaneously but the filling 36a, being under only atmospheric pressure, is more easily compressed than the filling 45. As the compression of the strut continues, the rate of pressure build-up is greatly diminished, due to the much larger volume of air which is being compressed. In the past, considerable difficulty has been experienced with nose wheel oleo struts on airplanes due to the fact that a small change in inflation pressure would cause an appreciable movement from the static position. The use of a smaller air chamber to produce a rapid pressure build-up in the vicinity of the static position corrects this trouble. However, in the conventional strut it causes excess pressure to occur as the strut reaches its fully compressed position. In the present invention the final pressures are materially lower than conventional and are not excessive.

Referring now to Figure 4, this figure employs reference numerals corresponding to the previous figures, except that the third digit "0" appears at their ends.

In Figure 4, the cylinder 100 is divided into an oil chamber 190, an air-oil chamber 300 and a spring-filled air chamber 450. In this construction, the first piston 110 operates preferably upward from the lower end of the cylinder 100 thru a closure 290 in which there is hydraulic packing 290a. The first piston 110 is provided with a head 220 closely fitting the inside diameter of the oil chamber 190 by hydraulic packing 220a. It bears centrally the metering pin 270, which however, may be omitted if desired. The pin 270 is aligned with a flared opening 260 in an orifice plate 240 which separates the oil chamber 190 from the air-oil chamber 300. The air-oil chamber 300 is normally considerably shorter than oil chamber 190.

An internal lug 160 serves as a stop for a free or second piston 320 having a head 340 which is provided with packing 340a. Together, the lug 160 and piston 320 serve to separate the air-oil chamber 300 from the spring-filled chamber 450. The piston head 320 and a top closure 120 for the upper end of cylinder 100 are provided with internal bosses 330 and 330a (upper and lower, respectively) which serve to centrally position the helical coil spring 400. This spring serves both to resist upward compression and to return the free piston upon cessation of the compressing force. An air vent 430 is preferably provided in the closure 120.

*Operation*

It is assumed that the upper part of cylinder 100 is attached indirectly to the airplane fuselage and the piston 110 indirectly to the nose landing wheels. A dynamic force tending to push piston 110—220 and its associated metering pin 270 upward, displaces the oil in chamber 190 and allows a controlled oil leakage upwardly thru the orifice 260. The air in the air-oil chamber thereupon becomes compressed, followed by compression of the oil in both chambers 300 and 190 respectively. When the total upward pressure on the piston head 340 exceeds the total downward pressure of spring 400 the free piston 320 moves upward and further compresses the spring 400. Air from the chamber 450 is vented to atmosphere thru the vent 430. Upon cessation of the force, the spring 400 returns the free piston to its original position and the piston 220 is likewise forced back due to pressure on the outer end of the metering pin 270. The rate of return is governed by the area of the vent 430.

In this manner, the rate of axial deflection vs. static force is changed when the selected force or capacity of the absorber is reached without materially changing the dynamic characteristics of strut compression during the major portion of the stroke. Toward the end of the static stroke, the spring serves to allow greater deflection per unit load than would be normally attained with an air-oil chamber approaching infinite compression ratio.

What I claim is:

1. A hydraulic shock absorber comprising a cylinder adapted to serve as a reservoir for hydraulic fluid, a first hollow piston reciprocable in said cylinder and having a flow-resisting orifice for admission of hydraulic fluid from said cylinder to the interior of said first hollow piston, a second hollow piston, said second hollow piston being freely reciprocable from a stop in said first hollow piston and having a closed air chamber with a valved restricted fluid port communicatively connected to receive hydraulic fluid discharged into said first hollow piston and to compress the air in said air chamber and a charge of air under pressure in said first hollow piston above said second hollow piston and yieldingly resisting relative reciprocation between said hollow piston members.

2. In a shock absorber of the oleo-strut type, a pair of telescoping tubular members closed at their outer ends, a filling of oil in the lower one, a filling of compressed air in the upper one, said filling being of sufficient volume and compression to support the normal static load, an orifice plate positioned at the lower end of the upper tubular member, a metering pin positioned in the lower portion of the lower tubular member and adapted to enter the orifice of the orifice plate with a loose fit, a free floating piston of the spool type above said orifice plate in the upper tubular member and having an interior space between the spool ends, means in said free piston for receiving said metering pin, means for supplying and admitting oil and air to the interior space of said free piston, between the spool ends thereof a part of said oil being admissible under the urge of the downward movement of said upper tubular member under dynamic load, the successive compression of said oil in the lower tubular member, the oil and air in said piston and the compressed air in said upper tubular member producing a decreasingly rapid rise of pressure which opposes compression of said shock absorber and provides a greater volume of air to be compressed than is normal in conventional shock absorbers of comparable size.

3. In a shock absorber of the oleo-strut type provided with telescoping tubular members having closed outer ends, a compressed air filling in the top of the absorber, said air being initially compressed to a pressure at which it can unaided prevent further telescoping of the absorber under normal conditions of static load, means including a free piston of the spool type having spaced spool end skirts and reciprocable within the smaller diameter tubular member from a stop for applying dynamic load to said compressed air filling, and having an interior space, a filling of air and oil initially under substantially atmospheric pressure within said free piston interior space intermediate the spool ends, a filling of oil in the lower part of said absorber, metering means producing a restricted flow of oil from said oil filling in the lower part of the absorber into the interior space of said free piston upon telescoping movement to increase the pressure of the air and oil within the free piston under dynamic conditions at a predetermined rate so that an extremely rapid build up of pressure may occur on a small volume of air in said free piston, a larger volume of air being at the top of the absorber, each of said volumes having a different initial resistance to compression, of the absorber, the smaller of the two volumes of air in the free piston having the smaller initial of resistance so that the initial shock is readily taken up but the increase in pressure of the air fillings will increase their total resistances in an extremely short time to a high uniform degree at a differential rate, the total rate decreasing after the smaller volume is compressed to the initial pressure of the larger one.

4. In a shock absorber of the oleo-strut type having a pair of superposed telescoping tubular members closed at their outer ends, means for introducing and for containing a filling of compressed air in the top of the absorber, means for containing a filling of oil in the bottom of the absorber, cooperating metering means at the open end of the top tubular member and attached to the bottom of the bottom tubular member, a free-floating piston of the spool type having an interior between said spool ends, and slidable between the metering means at the open end of the top tubular member and into the filling of compressed air, whereby to further compress the latter, means for admitting a partial filling of air and a partial filling of oil into the interior of said free floating piston between the spool ends thereof, metering means in said free-floating piston to admit additional oil from the bottom of the absorber to the interior of said piston under dynamic load to compress said partial filling of air therein, means in said free-floating piston to receive the first mentioned metering means which is attached to the bottom of the lower tubular member upon further application of dynamic load and movement of the metering means, further telescoping movement displacing said free piston upwardly to compress the compressed air filling in the top of the upper tubular member still further, and annular guiding and sealing means at the top of the lower tubular member for guiding the upper tubular member into the lower tubular member and for sealing off the interior of the free-floating piston while the latter is moved upwardly in the upper tubular member a predetermined distance relative to the upper tubular member.

5. A shock absorber of the oleo-strut type comprising a pair of telescoping cylindrical members each closed at their outer ends, a hydraulic seal between said members substantially at the mouth of the larger-diameter one, a bearing collar substantially at the inner end of the smaller-diameter cylindrical member forming a lower seal whereby to form a piston-like structure, a vertically-positioned metering pin attached to the closed end of said larger-diameter cylindrical member, a substantially vertically orificed closure member across the mouth of the smaller-diameter cylindrical member, the orifice thereof being adapted to receive said metering pin with a loose fit, a free floating piston vertically slidable within the smaller-diameter cylindrical member, above said orificed closure member and having upper and lower skirts, said free floating piston having a central tubular chamber, extending upwardly from said lower skirt adapted to receive said metering pin upon further downward travel of said free floating piston under load, said lower skirt being vertically orificed above said closure member, and the upper skirt being closed, a spring pressed valve disposed above the vertical orifice in the lower skirt and adapted to resist upward pressure exerted through the orifice in said lower skirt, said chamber and said valve having orifices therein adapted to register under dynamic load and movement of the valve relative to the lower skirt, an annular oil storage space between the cylindrical telescoping members between the upper and lower seals of the one of smaller-diameter, said inner cylindrical member having an orifice in its sidewall positioned to admit oil between the upper and lower skirts of said free floating piston, a filling of oil and air between the skirts of said free floating piston, a filling of air in said inner cylindrical member above said piston, said air being compressed to a degree as great as is necessary to support the static load on the strut, and a filling of oil in the outer cylindrical member below said piston and orificed closure member, such disposition of said fillings being to insure their elastic compression in the order in which they are named, upon exertion of load having a substantial vertical component upon the shock absorber.

6. A hydraulic shock absorber comprising a lower cylinder adapted to contain a hydraulic fluid, an upper hollow cylindrical piston reciprocable in the lower cylinder having a closed upper end and adapted to contain a compressible pressure fluid under predetermined initial pressure, a free floating hollow piston reciprocatable within the upper piston for retaining the compressible pressure fluid confined within the upper piston, said free floating piston comprising vertically spaced upper and lower piston skirts slidable on the inner surface of the upper piston to provide a combined hydraulic and compressible fluid containing chamber therein between said piston skirts, said lower piston skirt having a central tubular member extending upwardly therefrom connected to said upper piston skirt, with its upper end closed and its lower end opening into the space below the lower piston skirt, said lower piston skirt having a fluid delivery aperture therethrough intermediate the tubular member and the inner wall of the upper piston to provide restricted fluid communication between the spaced upper and lower piston skirts and the interior of the upper cylinder below the lower piston skirt, a foot valve slidable on said tubular member between said piston skirts having a closure valve plate fixed thereon for partially restricting said fluid delivery aperture to restrict the flow therethrough, spring means between said free floating piston and said foot valve yieldably urging said foot valve toward said fluid delivery aperture, said tubular member and foot valve having cooperating fluid communication apertures formed in the walls thereof adapted to register upon predetermined upward movement of said foot valve for establishing fluid communication between the interior of the tubular member and the space between the spaced piston skirts, a closure plate fixed across the lower end of the upper hollow cylindrical piston member below the free floating piston, limiting outward movement of the free floating piston and formed with a restricted fluid communication passage therein disposed in alignment with the opening in the lower end of the tubular member, for admitting fluid from the lower cylinder into the lower end of the upper hollow cylindrical piston below the free floating hollow piston.

7. In a shock absorbing strut, a lower cylinder adapted to contain a hydraulic fluid, an upper hollow cylindrical piston reciprocable in the upper end of the lower cylinder and having a closed upper end and adapted to contain a gaseous fluid under a predetermined initial pressure, a flow restriction plate fixed across the lower end of said upper hollow cylindrical piston having a central flow restriction aperture therethrough, a free floating piston mounted within the upper cylindrical piston above said flow restriction plate comprising a lower piston skirt, an upwardly spaced upper piston skirt, and a fixed tubular connection therebetween having a metering pin receiving opening therethrough open at its lower end in alignment with the central flow restriction in said flow restriction plate and closed at its upper end adjacent the upper piston skirt, a fluid flow control metering pin fixed in the lower end of the lower cylinder, in alignment with said central flow restriction to receive said metering pin therein, said lower piston skirt having a fluid by-pass opening therethrough, a foot valve sleeve slidable on said tubular connection having a valve plate thereon for controlling said fluid by-pass opening, spring means between the upper piston skirt and said foot valve yieldably urging the valve plate toward said by-pass opening to restrict the fluid flow therethrough, said tubular connection having a fluid by-pass opening therethrough intermediate said spaced piston skirts for establishing fluid communication between the interior of the tubular connection and the space between the piston skirts, said foot valve sleeve having a cooperating fluid control aperture therein arranged to register with the tubular connection by-pass opening upon predetermined relative upward movement of said foot valve sleeve by said foot valve, said lower cylinder having an internal annular spacing guide means and a fluid seal at the inside of the top thereof engaging the exterior of the upper cylindrical piston, annular spacing guide means fixed on the lower end of said upper cylindrical piston member in guiding engagement with the interior of the lower cylinder to provide an annular space between the walls of said lower cylinder and said upper piston intermediate said annular guide means on said lower cylinder and upper cylindrical piston, said upper cylindrical piston having a fluid by-pass opening formed in the wall thereof establishing fluid communication between the last mentioned annular space and the space within the upper cylindrical piston intermediate said piston skirts, said free floating piston and said annular space containing both liquid and gas, said free floating piston being displaceable relatively toward the upper end of said upper cylindrical piston to traverse said fluid by-pass opening in the wall of the cylindrical piston to establish fluid communication between the said annular space and the interior of the upper cylindrical member between free floating piston member and said flow restrictive plate.

References Cited in the file of this patent

UNITED STATES PATENTS

| | | |
|---|---|---|
| 2,156,117 | Johnson | April 25, 1939 |
| 2,333,096 | Dowty | Nov. 2, 1943 |
| 2,356,481 | Thornhill | Aug. 22, 1944 |
| 2,370,942 | Dick | Mar. 6, 1945 |

FOREIGN PATENTS

| | | |
|---|---|---|
| 248,678 | Switzerland | Feb. 16, 1948 |
| 984,666 | France | Feb. 28, 1951 |